Nov. 18, 1958     A. YANOWITZ     2,860,806
CIRCULAR BAY TANK STRUCTURE

Filed May 31, 1956     2 Sheets-Sheet 1

Arthur Yanowitz     Inventor

By *[signature]*     Attorney

Arthur Yanowitz — Inventor

United States Patent Office 2,860,806
Patented Nov. 18, 1958

2,860,806

CIRCULAR BAY TANK STRUCTURE

Arthur Yanowitz, Elizabeth, N. J., assignor to Esso Research and Engineering Company, a corporation of Delaware Application May 31, 1956, Serial No. 588,496

10 Claims. (Cl. 220—1)

The present invention relates to a storage tank structure. More particularly, the present invention relates to a storage tank for liquids, wherein the forces exerted by the hydrostatic pressure of a certain head of a liquid contained within the tank structure are substantially resolved by internal structural members thereby placed under tension.

Conventional tanks may be circular, spherical or spheroidal. The tank structure of the present invention is intended substantially to replace the conventional circular tank form, and particularly such form of tank when required to have a diameter greater than about 100 feet. Although the structure as contemplated is not limited to any such minimum diameter, its advantages over the conventional circular form become more significant as the required diameter increases.

In the conventional circular tank form, as the diameter is increased, the required thickness of the steel plates employed in its construction increases proportionally, substantially according to the formula:

$$\frac{HDW}{24SE} = t$$

wherein

H expresses the numerical value of the height in feet of the liquid to be contained;
D expresses the numerical value of the diameter in feet of the liquid container;
W expresses the numerical value of the weight in lbs. per cubic foot of the liquid to be contained;
S expresses the numerical value of the design or working stress in lbs. per square inch of the plate steel;
E expresses the accepted percent efficiency of the joints between plates with reference to the efficiency of the plate steel which is taken as 1; and
t is the plate thickness expressed in inches.

Also, where joints between plates are welded, as the plate thickness increases, the amount of weld metal required increases. With larger amounts of weld metal required to be deposited in the plate joints, it also becomes necessary to finish the plates with bevelled edges to provide V joints to receive the welds. This is an item of extra cost. An accepted relationship of weld metal area to plate thickness in a typical 45° bevel weld joint is according to the formula $$A = \frac{t^2}{2}$$

wherein A represents the weld area and $t$ is the plate thickness. Obviously as the weld area is reduced by reduction of plate thickness, the total volume of weld metal required for any joint, vertically or horizontally, is also reduced. By comparison with conventional tank construction requirements, plate thickness may be reduced as much as 45%, with a reduction in the amount of weld metal required for a safe joint, as is indicated by the above formula. Also as thinner plates are employed, the need for bevelled plates is reduced, thereby effecting further economies in construction costs. Further as the volume and depth of the welded joints are increased, the incidence of welding flaws increases. In addition, as the plate metal thickness is increased, the hazard of "brittle fracture" is increased. It has been substantially determined that brittle fracture of steel plates is a function of metal thickness.

It is an object of the present invention to provide a storage tank wherein the relationship between the tank diameter and the wall plate thickness may be so modified as to reduce plate thickness requirements by comparison with those for a conventional circular tank of similar capacity. It is another object of the present invention to provide a tank structure wherein the forces exerted by the hydrostatic pressure of contained liquids are at least partially resolved by internal structural members under tension rather than by the external wall structure alone. It is a further object of the invention to provide a tank structure wherein the amount of welding metal required for stressed joints is substantially reduced by comparison with structural standards and techniques applicable in the fabrication of conventional tanks.

The invention and its objects may be more fully understood from the following description when read in conjunction with the accompanying drawings, wherein.

Figure 1:
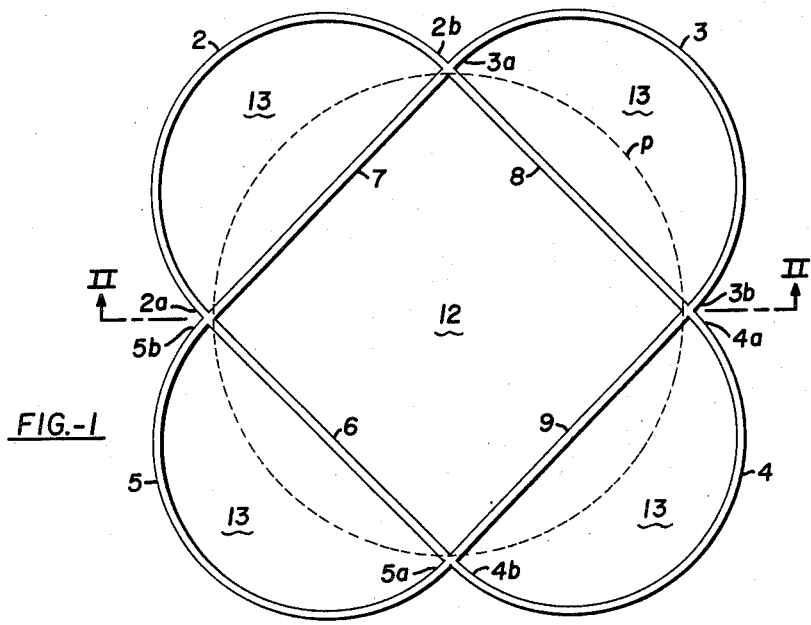
Fig. 1 is a plan view of a storage tank according to the present invention, omitting the roof and roof supporting members.
Figure 2:
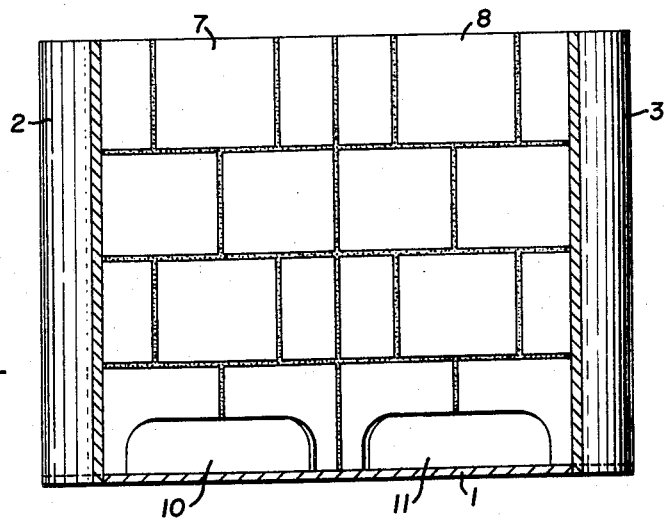
Fig. 2 is a vertical section through the structure of Fig. 1, taken along the line II—II therein.
Figure 3:
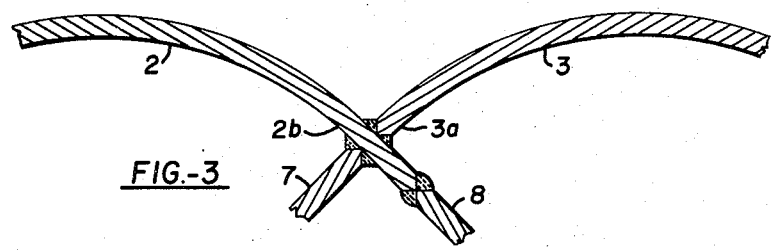
Fig. 3 is an enlarged view of a portion of the structure of Fig. 1 taken at the junction of two vertical wall elements shown therein.

Referring now to the tank structure as shown by Figs. 1 and 2, and 3, the numeral 1 designates a suitable floor or bottom closure for the tank. The numerals 2, 3, 4 and 5 designate a series of vertical wall elements, each of which is semi-circular, and consists of a one-half vertical section of a right cylinder. As in a conventional tank structure, these wall elements may be constructed of a plurality of individual wall plate members welded, riveted or otherwise joined in liquid-tight relation one to another along their peripheral edges.

As shown in Fig. 1, the wall elements 2 and 4 constitute a mirror-opposite pair, as do the wall elements 3 and 5 also. Each of these wall elements includes two diametrically opposed, vertical edge portions. In Figs. 1, 2 and 3, these edge portions are designated by the numerals of the related wall element plus the letters $a$ and $b$ respectively. Thus, the wall elements 2, 3, 4 and 5 respectively have vertical edge portions designated by the numerals 2a, 2b, 3a, 3b, 4a, 4b, 5a and 5b. In the structure contemplated, the "a" edge portion of any one wall element immediately adjoins and is substantially secured in liquid-tight relation to the "b" edge portion of the next wall element in the series. Also, in the mirror-opposite pairs of elements, the edge portions are disposed in opposed "a" and "b" edge relationship.

Figure 4:
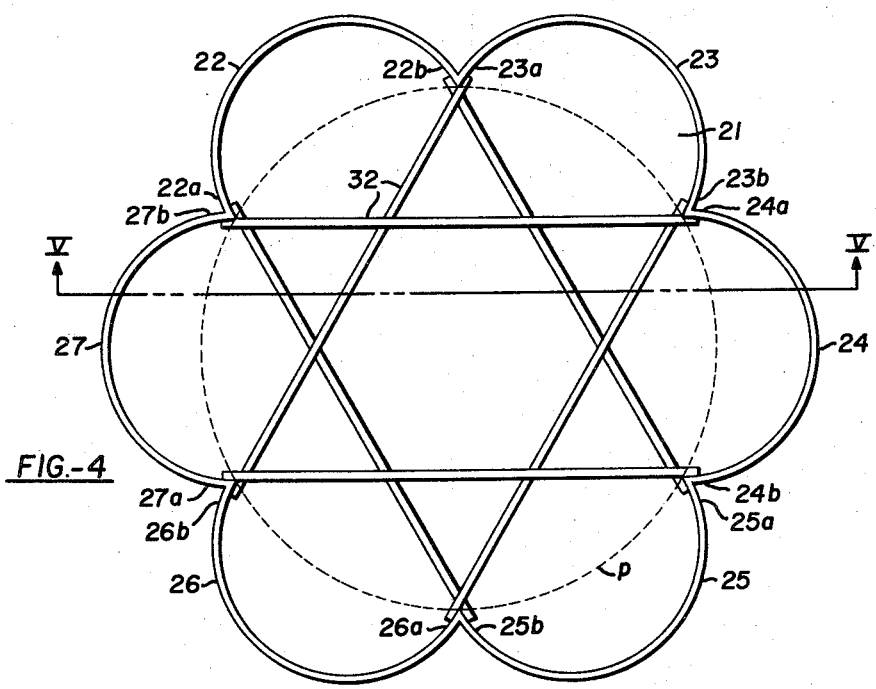
Fig. 4 is a view, similar to that of Fig. 1, of a modified form of tank structure according to the present invention.

The structure as contemplated by the present invention is further characterized by the fact that each of the wall elements, such as elements 2, 3, 4 and 5 of Fig. 1 are arranged as a series exteriorly of a substantially circular path, such as designated by the letter $p$ in Figs. 1 and 4, with the vertical edge portions of the several elements in any such series of elements juxtaposed substantially in liquid-tight relation, and with such circular path common to and extending through the diametrically opposite vertical edge portions common to each wall element. When so arranged, the diameters of the several wall elements will inscribe within such circular path a regular polygon having an even number of sides equal to the number of wall elements.

In Figs. 1, 2 and 3, the numerals 6, 7, 8 and 9 designate tension members which are also arranged in pairs to connect the opposed pairs of wall elements. As shown, the tension members 6 and 8 connect the edge portions 2a and 2b with edge portions 4b and 4a respectively, while the tension members 7 and 9 connect the edge portions 3a and 3b with edge portions 5b and 5a respectively.

In the form of the apparatus as shown in Figs. 1, 2 and 3, the tension members which connect mirror-opposite wall elements are plate members, substantially secured to the vertical edge portions of their related wall elements. These tension members may be riveted, welded or otherwise secured to the wall element vertical edge portions. In the structure as illustrated by Fig. 3, a suitable arrangement for welded joints between tension members and wall elements is shown.

In the assembly and structure illustrated by Fig. 3, the junction between two adjoining wall elements and also with their related tension members is shown in greater detail. In a structure thus assembled, the attachment pattern illustrated would be repeated throughout a given series of wall elements. This arrangement contemplates that the "b" edge portion such 2b of the wall element 2 in Figs. 1 and 2 is made to be substantially continuous with one edge of a related tension member such as the member 8 of Figs. 1 and 2. This tension member is substantially tangentially related to the wall element 2 at the edge portion 2b, and angularly related to a diameter of the wall element extended between its vertical edge portions. The "a" edge portion of the next adjoining wall element, such as the edge portion 3a of wall element 3, is disposed in angular contact at the intersection of the aforementioned diameter with the tension member 8 and the edge portion 2b at their junction and exteriorly thereof. The edge portion 3a is secured in liquid-tight relation at such contact point, and in opposed relation to the end edge of a tension member such as member 7 secured at the opposite end edge thereof in continuous relation to the vertical "b" edge portion of the wall element which is the mirror-opposite of wall element 3. This mirror-opposite wall element is not shown in Fig. 3, but would be the wall element 5 of Fig. 1. Thus the tension members 6, 7, 8, and 9 are substantially continuous wtih the wall elements 4, 5, 2 and 3 respectively at their edge portions 4b, 5b, 2b and 3b and continuous with the wall elements 2, 3, 4 and 5 at their edge portions 2a, 3a, 4a and 5a.

In the tank structure as represented in Figs. 1, 2 and 3, the tension members 6, 7, 8 and 9 are plate members, extending vertically from top to bottom of the tank and horizontally between the several wall element edge portions. These plate members may be assembled, substantially in the manner employed for construction of the side wall elements, from a plurality of plates riveted, bolted, welded or otherwise joined in edge to edge relation. As contemplated according to the present invention, however, fixed, horizontal joints may be dispensed with, when the tension members are not additionally employed to support vertically imposed forces. Under certain circumstances the tension members may be made up of vertically spaced, horizontal courses principally secured at their lateral edge portions. Also, as shown in Fig. 2, the tension plate members 6, 7, 8 and 9 may define passageways as indicated by the numerals 10 and 11, whereby to afford communication between the semi-circular bays defined by the side wall elements outwardly of the tension members and the central compartment defined inwardly of the tension members. This central compartment and each of the several bays are designated in Fig. 1 by the numerals 12 and 13 respectively.

Figure 5:
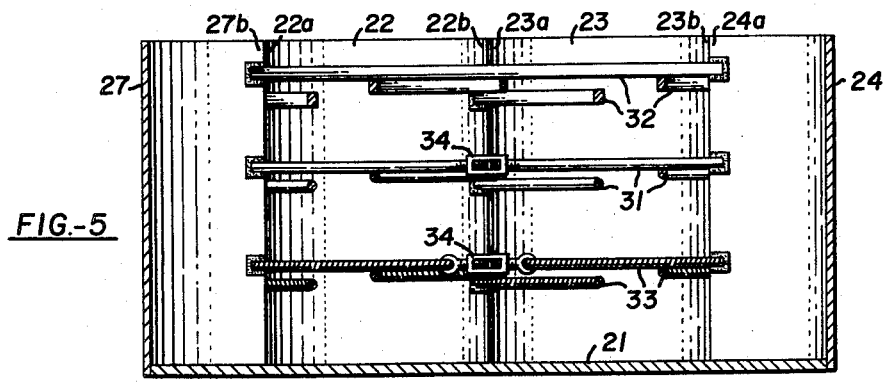
Fig. 5 is a vertical section through structure of Fig. 4, taken along the line V—V therein.

Figs. 4 and 5 illustrate a modified form of a tank structure according to the present invention. As shown, the structure is provided with a floor or base 21 on which are mounted a plurality of semi-circular wall elements similar to those designated by the numerals 2, 3, 4 and 5 in the structure illustrated by Figs. 1, 2 and 3. In the structure now illustrated, however, two additional wall elements are included for a total of six as compared with the four of the previously mentioned figures. In Figs. 4 and 5, these wall elements are designated by the numerals 22, 23, 24, 25 and 26 and 27, each of which has diametrically opposite vertical edge portions. These edge portions are designated by the numerals 22a, 22b, 23a, 23b, 24a, 25a, 25b, 26a, 27a and 27b, respectively.

The several wall elements 22 to 27 inclusive are arranged and related similarly to the wall elements 2 to 4 inclusive of Figs. 1, 2 and 3 so as to be disposed exteriorly of a circular path substantially as shown by the dotted line in Fig. 4. When thus arranged, the diameters of the semi-circular wall elements extended between their opposite vertical edge portions are disposed so as to inscribe a regular polygon within the circular path. In this instance, the structure being composed of six vertical wall elements, the inscribed polygon is a regular hexagon wherein the wall element diameters form the respective sides thereof. Also, as shown in Figs. 4 and 5, the junctions between vertical edge portions of adjoining wall elements occur at the several vertex angles of the inscribed polygon.

The structure according to Figs. 4 and 5 being of regular form, as is the structure of Figs. 1, 2 and 3, is also characteristically similar in other respects. For example, each of the vertical wall elements has a mirror-opposite wall element diametrically of the circular path to which they are related; the vertical "a" edge portion of one wall element is opposed to the vertical "b" edge portion of its mirror-opposite element; and the vertical "b" edge portion of one wall element is disposed adjacent and in fluid-tight relation to the "a" edge portion of the next adjoining element.

The tank structure is also provided with a series of tension members joined to and extended between the opposed edge portions of each pair of mirror-opposite wall elements. In this instance, however, instead of the plate elements 6, 7, 8 and 9 of Figs. 1, 2 and 3, rods, bars or cables are employed. All three of these tension member forms are shown in Fig. 5 wherein they are designated by the numerals 31, 32 and 33 respectively. The bar elements 32 are also shown by Fig. 4. If desired, a tension member comprising a chain may be substituted for any of the forms illustrated.

Any suitable means may be employed for attaching any one of the different types of tension members, indicated by the numerals 31, 32 and 33, to the respective wall elements. In the structure as illustrated by Figs. 4 and 5, the outer ends of the tension members are shown to be attached to the inner surfaces of the vertical wall elements at the vertical edge portion thereof by welding. Further, in this modified form of the structure, the tension members are arranged as a vertically spaced series of horizontally extending members. Also, the members of one series are slightly displaced vertically from the members in any other series whereby to avoid intersection of such members in the same horizontal plane.

As illustrated in Fig. 5, when employing a series of individual tension members, provision may be made for adjustment of the tension of each member. As shown, each of the members 31 and 33 is constructed in two parts, each having an outer end secured to the vertical edge portion of one of a pair of opposed vertical wall elements, and an inner end linked to the inner end of the other part by tension adjusting means such as the turn buckles indicated in Fig. 5 by the numeral 34.

In assembling a tank structure according to the present invention, substantially conventional procedures may be followed. After preparation of the base or foundation, including a bottom wall for the tank structure, the side walls are erected in successive horizontal courses and plate by plate, welding or otherwise joining the edge of one plate to that of another in liquid-tight relationship, and each course to the one next below. Columns for the support of roof rafters and a roof are erected in the usual fashion. As the side walls are erected, preferably the tension members of whatever form to be employed are attached to the vertical edge portions of the several wall elements in the manner previously set forth. In such a structure it is customary to join the vertical side walls in liquid-tight relation to the bottom wall of the tank. It is contemplated, according to the present invention that as thus joined, the bottom wall of the tank will supplement the action of the internal tension members previously described.

What is claimed is:

1. A storage tank structure comprising an even number of semi-circular vertical wall elements in a series of at least four wall elements of equal radius, each of which is a one-half vertical section of a right cylinder, having two diametrically opposite vertical edge portions, said wall elements arranged in liquid-tight, edgewise juxtaposition one to another exteriorly of a circular path common to the diametrically opposite edge portions of each wall element, each wall element being disposed in paired, mirror-opposite, edgewise relation to one other wall element in said series, and spaced therefrom diametrically of said circular path and tension means substantially connecting the opposite edge portions of each pair of mirror-opposite wall elements along lines parallel to each other and perpendicular to the respective diameters of said wall elements.

2. A storage tank structure according to claim 1, wherein said series of wall elements consists of four such elements and said tension means are vertical plate elements disposed diametrically of each wall element, substantially vertically continuous therewith and defining an inner, square compartment of which each side defines the inner wall of a semi-circular compartmental bay outwardly of said inner square compartment.

3. A storage tank structure according to claim 2, wherein each of said vertical plate members defines at least one passageway opening therethrough, and of which at least one said passageway is substantially defined by the bottom edge of each vertical plate member.

4. A storage tank structure according to claim 1, wherein said tension means comprises a plurality of individual connector elements extended between and substantially secured to the opposed edge portions in each of said paired wall elements in said series.

5. A storage tank structure according to claim 4, wherein each of said individual connector elements essentially consists of a pair of individual element portions, each having an outer end substantially secured to one edge portion of one of said paired wall elements and an inner end, and adjustable means connecting the inner ends of each pair of individual connector element portions.

6. A storage tank structure according to claim 5, wherein said adjustable means connecting the inner ends of each pair of individual connector element portions is a turn buckle.

7. A storage tank structure according to claim 4, wherein said individual connector elements are rigid rod-like elements.

8. A storage tank structure according to claim 4, wherein said individual connecting elements are flexible elements selected from the class consisting of cables, tapes and chains.

9. A storage tank structure according to claim 1, wherein one edge portion of each wall element is substantially continuous with one tension means, which tension means is related substantially tangentially to said wall element, and wherein said diametrically opposite edge portion of said wall element is secured in surface contact with a tension means substantially continuous with and substantially tangentially related to an adjoining edge portion of a next adjacent wall element in said series.

10. A storage tank structure according to claim 1, including a bottom wall for said structure joined in substantially right angular, fluid tight relation to said vertical wall elements and wherein said tension means substantially includes those portions of said bottom wall joined to and connecting said wall element opposite edge portions.

References Cited in the file of this patent

UNITED STATES PATENTS

| | | |
|---|---|---|
| 1,668,179 | Williams | May 1, 1928 |
| 2,462,101 | Horton | Feb. 22, 1949 |